(12) United States Patent
Matsubara et al.

(10) Patent No.: US 10,410,757 B2
(45) Date of Patent: Sep. 10, 2019

(54) ELECTRIC CONDUCTION COMPONENT FIXATION STRUCTURE

(71) Applicant: HONDA MOTOR CO., LTD, Minato-ku, Tokyo (JP)

(72) Inventors: Munehiro Matsubara, Shimotsuga-gun (JP); Yuki Endo, Shimotsuke (JP); Tadanobu Aoki, Utsunomiya (JP); Toru Nakamura, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/804,060

(22) Filed: Nov. 6, 2017

(65) Prior Publication Data

US 2018/0130570 A1   May 10, 2018

(30) Foreign Application Priority Data

Nov. 9, 2016 (JP) ................. 2016-218722

(51) Int. Cl.

| | |
|---|---|
| *H05K 1/11* | (2006.01) |
| *H01B 5/00* | (2006.01) |
| *H01R 4/34* | (2006.01) |
| *H01R 4/58* | (2006.01) |
| *H02G 3/02* | (2006.01) |
| *H01R 4/64* | (2006.01) |

(52) U.S. Cl.
CPC .............. *H01B 5/002* (2013.01); *H01R 4/34* (2013.01); *H01R 4/58* (2013.01); *H01R 4/64* (2013.01); *H01R 2201/26* (2013.01); *H02G 3/02* (2013.01)

(58) Field of Classification Search
CPC ..... H05K 3/4046; H05K 3/429; H05K 3/3452

USPC .......................... 174/265, 266, 263
See application file for complete search history.

(56) References Cited

U.S. PATENT DOCUMENTS

| | | | | |
|---|---|---|---|---|
| 5,656,798 A | * | 8/1997 | Kubo ................. | H01L 21/486 174/263 |
| 9,461,398 B2 | * | 10/2016 | Nakamura .......... | H01R 12/585 |

FOREIGN PATENT DOCUMENTS

| | | |
|---|---|---|
| JP | 63-037172 | 2/1988 |
| JP | 10-226020 | 8/1998 |
| JP | 2009-298207 | 12/2009 |
| JP | 2013-170312 | 9/2013 |
| JP | 3187365 | 11/2013 |

(Continued)

OTHER PUBLICATIONS

Japanese Notice of Allowance for Japanese Patent Application No. 2016-218722 dated Oct. 16, 2018.

(Continued)

*Primary Examiner* — Phuong Chi T Nguyen
(74) *Attorney, Agent, or Firm* — Amin, Turocy & Watson LLP

(57) ABSTRACT

An electric conduction component fixation structure includes: a fixed member which has electrically conductive properties and on which an electric conduction component is arranged; and a press member that presses and fixes the electric conduction component, which is arranged on the fixed member, to the fixed member, wherein the fixed member includes a pressed surface that is pressed when the electric conduction component is fixed by the press member, and the pressed surface is covered by a rustproof coating film having a plurality of metal flakes which are layered and a binder which joins the plurality of metal flakes.

7 Claims, 3 Drawing Sheets

(56) References Cited

FOREIGN PATENT DOCUMENTS

| JP | 2014-187313 | 10/2014 |
| JP | 2014-191986 | 10/2014 |
| JP | 2015-137701 | 7/2015 |
| JP | 2016-033184 | 3/2016 |
| JP | 2016-153661 | 8/2016 |

OTHER PUBLICATIONS

Japanese Office Action for Japanese Patent Application No. 2016-218722 dated Apr. 17, 2018.

* cited by examiner

ELECTRIC CONDUCTION COMPONENT FIXATION STRUCTURE

CROSS-REFERENCE TO RELATED APPLICATION

Priority is claimed on Japanese Patent Application No. 2016-218722, filed on Nov. 9, 2016, the contents of which are incorporated herein by reference.

BACKGROUND

Field of the Invention

The present invention relates to an electric conduction component fixation structure.

Background

In the related art, for example, an electric component that is provided on a vehicle is grounded by so-called body earthing in which the electric component is electrically connected to a vehicle body via an earth cable, an earth terminal, a bracket, and the like (for example, refer to Japanese Unexamined Patent Application, First Publication No. 2014-187313).

SUMMARY

However, surfaces of the vehicle body and the bracket may be covered generally by a coating film (hereinafter, referred to as a "rustproof coating film") having rustproof properties. Therefore, when the earth terminal (electric conduction component) is fixed to the vehicle body, the bracket, and the like (fixed member), it is necessary to exfoliate the rustproof coating film of a part to which the earth terminal is fixed in order to ensure an electric conduction property between the earth terminal and the vehicle body, the bracket, and the like. As a result, rust may be generated at the part of which the rustproof coating film is exfoliated, and the rustproof properties may be degraded.

An object of an aspect of the present invention is to provide an electric conduction component fixation structure that is capable of ensuring an electric conduction property between an electric conduction component and a fixed member without degrading rustproof properties of the fixed member.

(1) An electric conduction component fixation structure according to an aspect of the present invention includes: a fixed member which has electrically conductive properties and on which an electric conduction component is arranged; and a press member that presses and fixes the electric conduction component, which is arranged on the fixed member, to the fixed member, wherein the fixed member includes a pressed surface that is pressed when the electric conduction component is fixed by the press member, and at least the pressed surface of the fixed member is covered by a rustproof coating film having a plurality of metal flakes which are layered and a binder which joins the plurality of metal flakes.

(2) In the above electric conduction component fixation structure, the press member may be a bolt, the electric conduction component may be interposed between and held by a head part of the bolt and the pressed surface of the fixed member, and a bolt hole in which the bolt is screwed may be provided on the fixed member.

(3) In the above electric conduction component fixation structure, the bolt may have electrically conductive properties, and at least any one of a contact surface with the electric conduction component in the bolt, a male screw part of the bolt, and an inner wall surface of the bolt hole may be covered by the rustproof coating film.

(4) In the above electric conduction component fixation structure, the electric conduction component may be an earth terminal, and the fixed member may be any of a vehicle body and a vehicle body-side bracket.

In the electric conduction component fixation structure according to the above aspect (1), the pressed surface of the fixed member is covered by the rustproof coating film having the plurality of metal flakes which are layered and the binder which joins the plurality of metal flakes. Thereby, when the rustproof coating film is pressed by the electric conduction component, the rustproof coating film is compressed, the plurality of metal flakes come into contact with each other, and the rustproof coating film has electrically conductive properties. As a result, the electric conduction component and the fixed member are electrically connected to each other via the rustproof coating film, and therefore, the electric conduction property between the electric conduction component and the fixed member is ensured without exfoliating the rustproof coating film of the fixed member. Therefore, the electric conduction component fixation structure according to the above aspect (1) can ensure the electric conduction property between the electric conduction component and the fixed member without degrading the rustproof properties of the fixed member.

In the electric conduction component fixation structure according to the above aspect (2), the press member is the bolt, the electric conduction component is interposed between and held by the head part of the bolt and the pressed surface of the fixed member, and the bolt hole in which the bolt is screwed is provided on the fixed member. Thereby, when the bolt is fastened, the rustproof coating film is easily compressed by an axial force of the bolt and has electrically conductive properties, and the electric conduction component and the fixed member are electrically connected to each other via the rustproof coating film. Therefore, the electric conduction component fixation structure according to the above aspect (2) can easily ensure the electric conduction property between the electric conduction component and the fixed member without degrading the rustproof properties of the fixed member.

In the electric conduction component fixation structure according to the above aspect (3), the bolt has electrically conductive properties, and at least any one of the contact surface with the electric conduction component in the bolt, the male screw part of the bolt, and the inner wall surface of the bolt hole is covered by the rustproof coating film. Thereby, when the bolt is fastened, the rustproof coating film has electrically conductive properties. Accordingly, in addition to the electric conduction component and the fixed member being electrically connected to each other, the electric conduction component and the fixed member are electrically connected to each other via the bolt, and an electric conduction path between the electric conduction component and the fixed member is increased. Therefore, the electric conduction component fixation structure according to the above aspect (3) can enhance the electric conduction property between the electric conduction component and the fixed member without degrading the rustproof property of the fixed member.

In the electric conduction component fixation structure according to the above aspect (4), since the electric conduction component is the earth terminal, and the fixed member is any of the vehicle body and the vehicle body-side bracket, by connecting an electric component that is provided on the vehicle to the earth terminal, it is possible to ground the electric component by body earthing without exfoliating the rustproof coating film of the fixed member. Therefore, the electric conduction component fixation structure according to the above aspect (4) can realize body earthing without degrading the rustproof properties of the fixed member.

DESCRIPTION OF THE EMBODIMENTS

Hereinafter, embodiments of the present invention will be described with reference to the drawings.

First Embodiment

Figure 1:
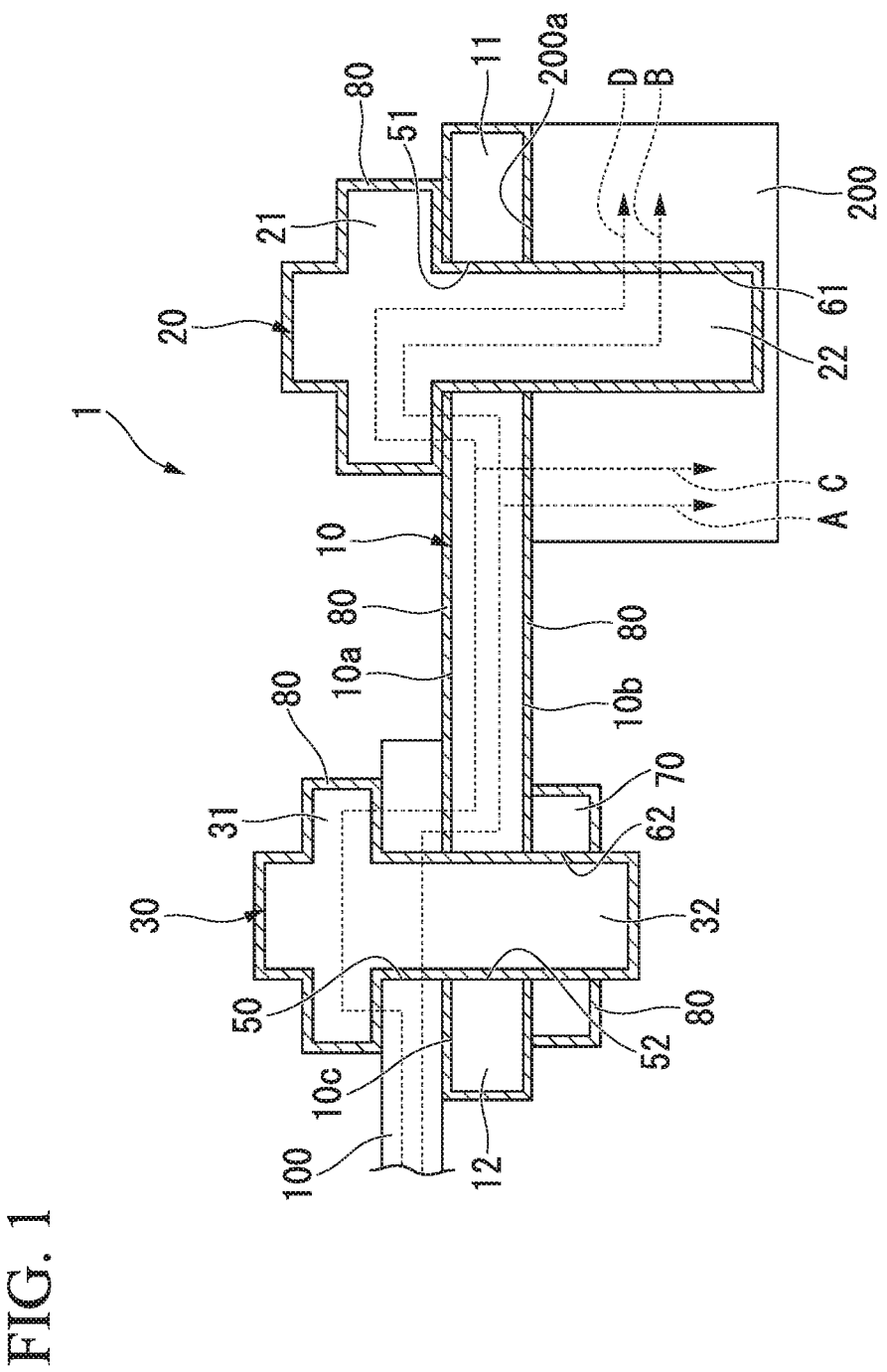
FIG. 1 is a schematic cross-sectional view showing an electric conduction component fixation structure of a first embodiment.

FIG. 1 is a schematic cross-sectional view showing an electric conduction component fixation structure 1 of a first embodiment of the present invention. In the electric conduction component fixation structure 1 of the first embodiment, an electric conduction component is an earth terminal 100. The electric conduction component fixation structure 1 of the first embodiment includes a bracket 10 (fixed member, vehicle body-side bracket), a first bolt 20, and a second bolt 30 (press member).

The bracket 10 is formed, for example, of a metal material such as iron in a flat plate shape and has electrically conductive properties. A first insertion hole 51 through which the first bolt 20 is inserted is formed on an upper surface 10a of one side part (first side part) 11 (right side part in FIG. 1) of the bracket 10. The one side part 11 of the bracket 10 is arranged on a surface 200a of a vehicle body 200. A first bolt hole 61 in which the first bolt 20 is screwed is provided on the vehicle body 200.

The earth terminal 100 is arranged on the upper surface 10a of the other side part (second side part) 12 (left side part in FIG. 1) of the bracket 10. A terminal insertion hole 50 through which the second bolt 30 is inserted is formed on the earth terminal 100. A second insertion hole 52 through which the second bolt 30 is inserted is formed on a part, which corresponds to the terminal insertion hole 50, of the upper surface 10a of the other side part 12 of the bracket 10.

A weld nut 70 is welded concentrically with the second insertion hole 52 to a more outside part of a lower surface 10b of the other side part 12 than the second insertion hole 52. The weld nut 70 has a second bolt hole 62 (bolt hole) in which the second bolt 30 is screwed.

The first bolt 20 is formed of a metal material and has electrically conductive properties. A male screw part 22 of the first bolt 20 is inserted through the first insertion hole 51 of the bracket 10 and is screwed in the first bolt hole 61 of the vehicle body 200. Thereby, the one side part 11 of the bracket 10 is pressed by a head part 21 of the first bolt 20, is interposed between and held by the head part 21 and the surface 200a of the vehicle body 200, and is fixed to the vehicle body 200.

The second bolt 30 is formed of a metal material and has electrically conductive properties. A male screw part 32 of the second bolt 30 is inserted through the terminal insertion hole 50 of the earth terminal 100 and the second insertion hole 52 of the bracket 10 and is screwed in the second bolt hole 62 of the weld nut 70. Thereby, the earth terminal 100 is pressed by a head part 31 of the second bolt 30, is interposed between and held by the head part 31 and a pressed surface 10c of the bracket 10, and is fixed to the other side part 12. The pressed surface 10c is a part which is pressed by the earth terminal 100 by an axial force that is generated by fastening the second bolt 30.

A rustproof coating film 80 is formed by GEOMET (registered trademark) on each of a surface of the bracket 10, a surface of the first bolt 20, a surface of the second bolt 30, and a surface of the weld nut 70. The rustproof coating film 80 is formed on the surface of the bracket 10, and thereby, the rustproof coating film 80 is formed on the pressed surface 10c of the bracket 10.

Figure 2:
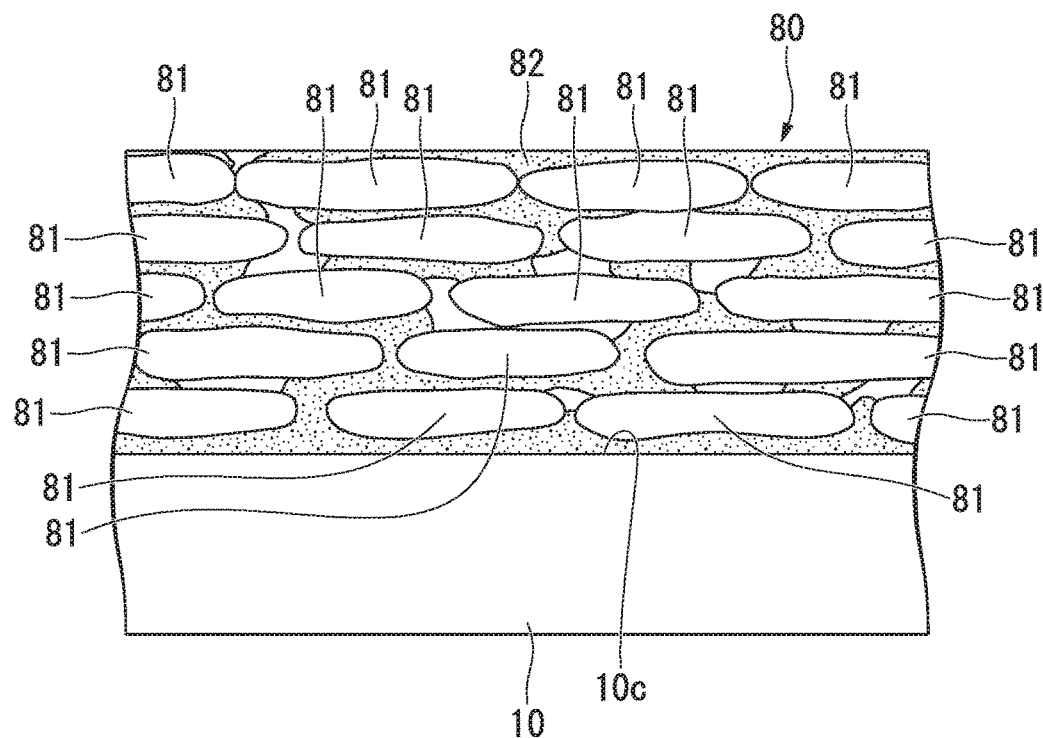
FIG. 2 is a cross-sectional view of a rustproof coating film of FIG. 1.

FIG. 2 is a cross-sectional view of the rustproof coating film 80. FIG. 2 shows a cross-section of the rustproof coating film 80 that is formed on the pressed surface 10c of the bracket 10. The cross-section of the rustproof coating film 80 that is formed on the other surfaces is the same as that of FIG. 2.

As shown in FIG. 2, the rustproof coating film 80 has a plurality of metal flakes 81 which are layered and a binder 82 which joins the plurality of metal flakes 81. The metal flake is a metal grain that is formed in a flake shape (flat shape). The rustproof coating film 80 is formed in this way and thereby has rustproof properties and an insulation property. When the rustproof coating film 80 is pressed, the rustproof coating film 80 is deformed while maintaining the rustproof properties, the plurality of metal flakes 81 come into contact with one another, and thereby, the rustproof coating film 80 has electrically conductive properties. When the pressed state is released, the rustproof coating film 80 has the insulation property again.

The electric conduction property at the time of the first bolt 20 and the second bolt 30 being fastened in the electric conduction component fixation structure 1 of the first embodiment that has the above configuration is described.

As shown in FIG. 1, the first bolt 20 and the bracket 10 are electrically connected to each other via the rustproof coating films 80, 80 at the time of the first bolt 20 being fastened. Specifically, the rustproof coating film 80 that is formed on the lower surface of the head part 21 of the first bolt 20 and the rustproof coating film 80 that is formed on the upper surface 10a of the one side part 11 of the bracket 10 are pressed by an axial force that occurs at the time of the first bolt 20 being fastened. Thereby, both rustproof coating films 80, 80 have electrically conductive properties. As a result, the head part 21 of the first bolt 20 and the one side part 11 of the bracket 10 are electrically connected to each other via both rustproof coating films 80, 80.

Further, the first bolt 20 and the vehicle body 200 are electrically connected to each other via the rustproof coating film 80 at the time of the first bolt 20 being fastened. Specifically, the rustproof coating film 80 that is formed on the surface of the male screw part 22 of the first bolt 20 is pressed by the axial force that occurs at the time of the first bolt 20 being fastened. Thereby, the rustproof coating film 80 has electrically conductive properties. As a result, the male screw part 22 of the first bolt 20 and the vehicle body 200 are electrically connected to each other via the rustproof coating film 80.

Further, the bracket 10 and the vehicle body 200 are electrically connected to each other via the rustproof coating film 80 at the time of the first bolt 20 being fastened. Specifically, the rustproof coating film 80 that is formed on the lower surface 10*b* of the one side part 11 of the bracket 10 is pressed by the axial force that occurs at the time of the first bolt 20 being fastened. Thereby, the rustproof coating film 80 has electrically conductive properties. As a result, the one side part 11 of the bracket 10 and the vehicle body 200 are electrically connected to each other via the rustproof coating film 80.

The second bolt 30 and the earth terminal 100 are electrically connected to each other via the rustproof coating film 80 at the time of the second bolt 30 being fastened. Specifically, the rustproof coating film 80 that is formed on the lower surface of the head part 31 of the second bolt 30 is pressed by the axial force that occurs at the time of the second bolt 30 being fastened. Thereby, the rustproof coating film 80 has electrically conductive properties. As a result, the head part 31 of the second bolt 30 and the earth terminal 100 are electrically connected to each other via the rustproof coating film 80.

Further, the earth terminal 100 and the bracket 10 are electrically connected to each other via the rustproof coating film 80 at the time of the second bolt 30 being fastened. Specifically, the rustproof coating film 80 that is formed on the pressed surface 10*c* of the bracket 10 is pressed by the axial force that occurs. Thereby, the rustproof coating film 80 has electrically conductive properties. As a result, the earth terminal 100 and the bracket 10 are electrically connected to each other via the rustproof coating film 80.

Accordingly, as shown in FIG. 1, in the electric conduction component fixation structure 1 of the first embodiment, at the time of the first bolt 20 and the second bolt 30 being fastened, at least four electric conduction paths A to D described below are formed.

(1) Electric conduction path A: an electric conduction path to the vehicle body 200 via the bracket 10 from the earth terminal 100

(2) Electric conduction path B: an electric conduction path to the vehicle body 200 via the bracket 10 and the first bolt 20 from the earth terminal 100

(3) Electric conduction path C: an electric conduction path to the vehicle body 200 via the second bolt 30 and the bracket 10 from the earth terminal 100

(4) Electric conduction path D: an electric conduction path to the vehicle body 200 via the second bolt 30, the bracket 10, and the first bolt 20 from the earth terminal 100

According to the electric conduction component fixation structure 1 of the first embodiment, the pressed surface 10*c* of the bracket 10 as the fixed member is covered by the rustproof coating film 80 having the plurality of metal flakes 81 which are layered and the binder 82 which joins the plurality of metal flakes 81. Thereby, when the rustproof coating film 80 is pressed by the earth terminal 100 as the electric conduction component, the rustproof coating film 80 is compressed, the plurality of metal flakes 81 come into contact with each other, and the rustproof coating film 80 has electrically conductive properties. As a result, the earth terminal 100 and the bracket 10 are electrically connected to each other via the rustproof coating film 80, and therefore, the electric conduction property between the earth terminal 100 and the bracket 10 is ensured without exfoliating the rustproof coating film 80 of the bracket 10. Therefore, the electric conduction component fixation structure 1 of the present embodiment can ensure the electric conduction properties between the earth terminal 100 and the bracket 10 without degrading the rustproof property of the bracket 10.

Further, in the electric conduction component fixation structure 1, the press member is the second bolt 30, the earth terminal 100 is interposed between and held by the head part 31 of the second bolt 30 and the pressed surface 10*c* of the bracket 10, and the second bolt hole 62 in which the second bolt 30 is screwed is provided on the bracket 10. Thereby, when the second bolt 30 is fastened, the rustproof coating film 80 is easily compressed by an axial force of the second bolt 30 and has electrically conductive properties, and the earth terminal 100 and the bracket 10 are electrically connected to each other via the rustproof coating film 80. Therefore, the electric conduction component fixation structure 1 of the present embodiment can easily ensure the electric conduction property between the earth terminal 100 and the bracket 10 without degrading the rustproof properties of the bracket 10.

Further, the second bolt 30 has electrically conductive properties, and the contact surface with the earth terminal 100 in the second bolt 30, the male screw part 32 of the second bolt 30, and the inner wall surface of the second bolt hole 62 are covered by the rustproof coating film 80. Thereby, when the second bolt 30 is fastened, the rustproof coating film 80 has electrically conductive properties. Accordingly, in addition to the earth terminal 100 and the bracket 10 being electrically connected to each other, the earth terminal 100 and the bracket 10 are electrically connected to each other via the second bolt 30, and an electric conduction path between the earth terminal 100 and the bracket 10 is increased. Therefore, the electric conduction component fixation structure 1 of the present embodiment can enhance the electric conduction properties between the earth terminal 100 and the bracket 10 without degrading the rustproof properties of the bracket 10.

Further, since the electric conduction component is the earth terminal 100, and the fixed member is the bracket 10 that is provided on the vehicle body 200, by connecting an electric component (not shown) that is provided on the vehicle to the earth terminal 100, it is possible to ground the electric component by body earthing without exfoliating the rustproof coating film 80 of the bracket 10. Therefore, the electric conduction component fixation structure 1 of the present embodiment can realize body earthing without degrading the rustproof properties of the bracket 10.

Second Embodiment

Figure 3:
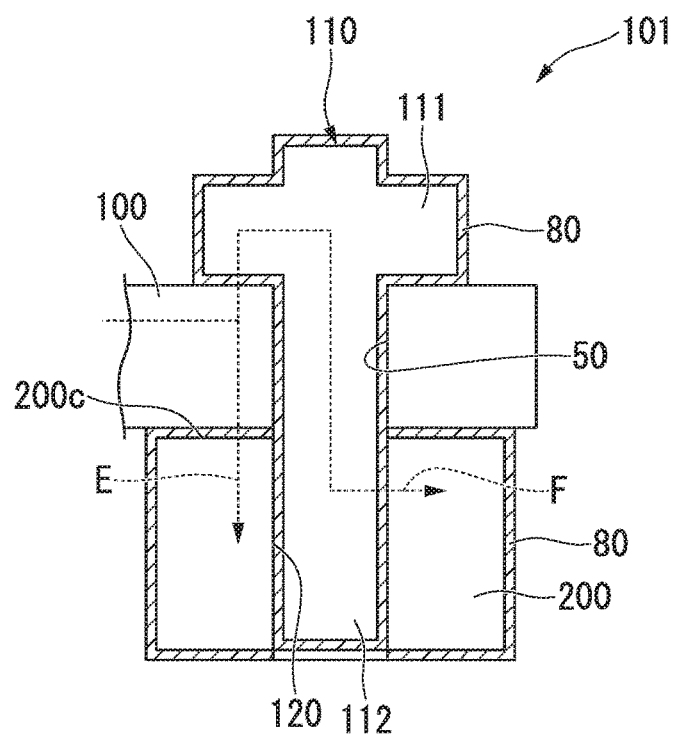
FIG. 3 is a schematic cross-sectional view showing an electric conduction component fixation structure of a second embodiment.

FIG. 3 is a schematic cross-sectional view showing an electric conduction component fixation structure 101 of a second embodiment of the present invention. In the electric conduction component fixation structure 101 of the second embodiment, the same reference numerals are given to parts similar to those of the electric conduction component fixation structure 1 of the first embodiment. The electric conduction component fixation structure 101 of the second embodiment includes a vehicle body 200 (fixed member) and a bolt 110 (press member).

The earth terminal 100 is arranged on a surface of the vehicle body 200. A bolt hole 120 in which the bolt 110 is screwed is provided on a part, which corresponds to the terminal insertion hole 50 of the earth terminal 100, of the surface of the vehicle body 200.

The bolt 110 is formed of a metal material and has electrically conductive properties. A male screw part 112 of the bolt 110 is inserted through the terminal insertion hole 50 of the earth terminal 100 and is screwed in the bolt hole 120 of the vehicle body 200. Thereby, the earth terminal 100 is pressed by a head part 111 of the bolt 110 by an axial force that occurs. The earth terminal 100 is interposed between and held by the head part 111 of the bolt 110 and a pressed surface 200c of the vehicle body 200 and is fixed to the vehicle body 200. The pressed surface 200c is a part, which is pressed by the earth terminal 100, of the surface of the vehicle body 200 when the bolt 110 presses the earth terminal 100.

A rustproof coating film 80 is formed on each of a surface of the vehicle body 200 and a surface of the bolt 110. Thereby, the rustproof coating film 80 is formed on the pressed surface 200c of the vehicle body 200.

The electric conduction properties at the time of the bolt 110 being fastened in the electric conduction component fixation structure 101 of the second embodiment that has the above configuration is described.

The earth terminal 100 and the vehicle body 200 are electrically connected to each other via the rustproof coating film 80 at the time of the bolt 110 being fastened. Specifically, the rustproof coating film 80 that is formed on the pressed surface 200c of the vehicle body 200 is pressed by the axial force that occurs at the time of the bolt 110 being fastened. Thereby, the rustproof coating film 80 has electrically conductive properties. As a result, the earth terminal 100 and the vehicle body 200 are electrically connected to each other via the rustproof coating film 80.

Further, the bolt 110 and the earth terminal 100 are electrically connected to each other via the rustproof coating film 80 at the time of the bolt 110 being fastened. Specifically, the rustproof coating film 80 that is formed on the lower surface of the head part 111 of the bolt 110 is pressed by the axial force that occurs at the time of the bolt 110 being fastened. Thereby, the rustproof coating film 80 has electrically conductive properties. As a result, the head part 111 of the bolt 110 and the earth terminal 100 are electrically connected to each other via the rustproof coating film 80.

Further, the bolt 110 and the vehicle body 200 are electrically connected to each other via the rustproof coating film 80 at the time of the bolt 110 being fastened. Specifically, the rustproof coating film 80 that is formed on the surface of the male screw part 112 of the bolt 110 is pressed by the axial force that occurs at the time of the bolt 110 being fastened. Thereby, the rustproof coating film 80 has electrically conductive properties. As a result, the male screw part 112 of the bolt 110 and the vehicle body 200 are electrically connected to each other via the rustproof coating film 80.

Accordingly, as shown in FIG. 3, in the electric conduction component fixation structure 101 of the second embodiment, at the time of the bolt 110 being fastened, at least two electric conduction paths E, F described below are formed.

(1) Electric conduction path E: an electric conduction path directly to the vehicle body 200 from the earth terminal 100

(2) Electric conduction path F: an electric conduction path to the vehicle body 200 via the bolt 110 from the earth terminal 100

The electric conduction component fixation structure 101 of the second embodiment includes the vehicle body 200 on which the earth terminal 100 is arranged and the bolt 110 that presses and fixes the earth terminal 100, which is arranged on the vehicle body 200, to the vehicle body 200. In the electric conduction component fixation structure 101 of the second embodiment, the rustproof coating film 80 is formed on the pressed surface 200c of the vehicle body 200 which is pressed by the earth terminal 100 when the bolt 110 presses the earth terminal 100.

Thereby, it is possible to obtain operation and advantages similar to the first embodiment. That is, when the rustproof coating film 80 is pressed by the earth terminal 100 at the time of the earth terminal 100 being fixed, the rustproof coating film 80 is deformed, the plurality of metal flakes 81 come into contact with one another, and the rustproof coating film 80 has electrically conductive properties. As a result, the earth terminal 100 and the vehicle body 200 are electrically connected to each other via the rustproof coating film 80, and therefore, the electric conduction properties between the earth terminal 100 and the vehicle body 200 is ensured without exfoliating the rustproof coating film 80 of the vehicle body 200. Therefore, the electric conduction component fixation structure 101 of the second embodiment can ensure the electric conduction properties between the earth terminal 100 and the vehicle body 200 without degrading the rustproof properties of the vehicle body 200.

Further, according to the electric conduction component fixation structure 101 of the second embodiment, the electric conduction component is the earth terminal 100, and the fixed member is the vehicle body 200. In this case, by connecting an electric component (not shown) that is provided on the vehicle to the earth terminal 100, it is possible to ground the electric component by body earthing without exfoliating the rustproof coating film 80 of the vehicle body 200. Therefore, the electric conduction component fixation structure 101 of the present embodiment can realize body earthing without degrading the rustproof properties of the vehicle body 200.

Next, the present invention is described showing Example and an experimental result. The Example described below is merely an example, and the present invention is not limited thereto.

Figure 4:
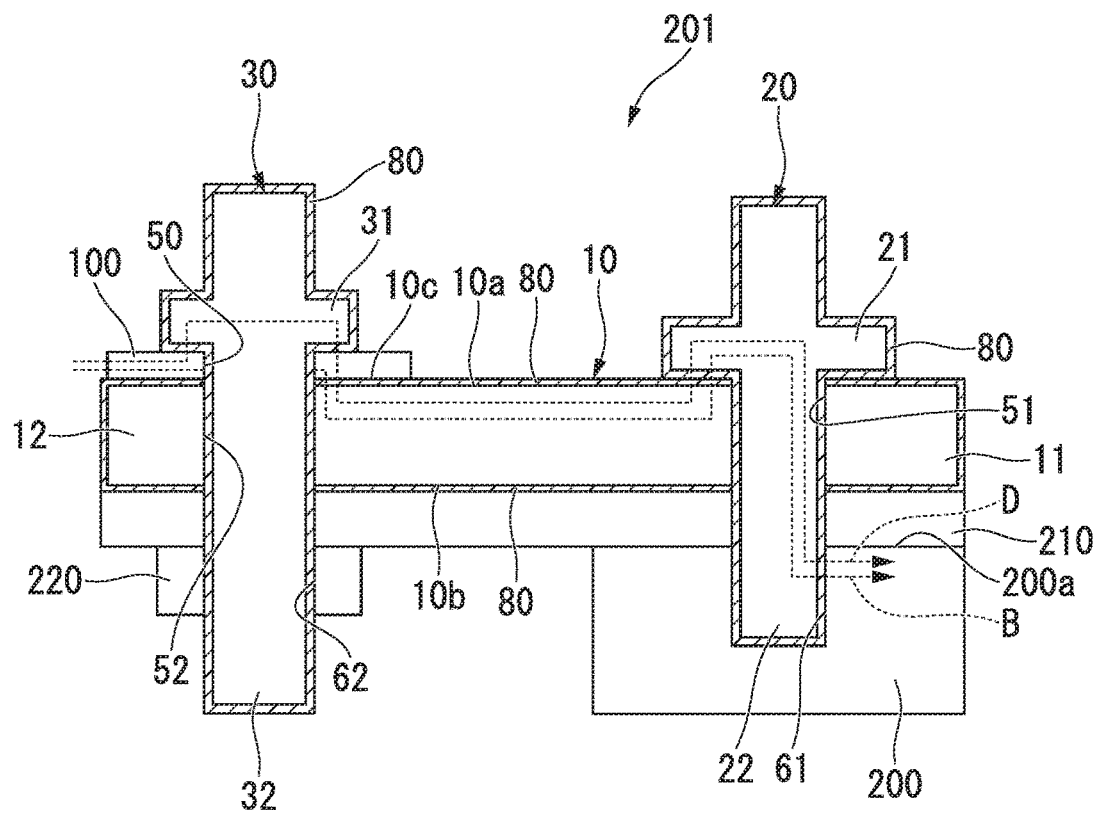
FIG. 4 is a cross-sectional view showing an electric conduction component fixation structure of Example.

FIG. 4 is a cross-sectional view showing an electric conduction component fixation structure 201 of Example of the present invention. In the electric conduction component fixation structure 201 of Example, the same reference numerals are given to parts which are the same as those of the electric conduction component fixation structure 1 of the first embodiment. In the electric conduction component fixation structure 201 of Example, an insulation paper 210 is interposed between the vehicle body 200 and the bracket 10. The second bolt 30 is screwed in a nut 220 below the insulation paper 210. The insulation paper 210 is interposed between and held by the nut 220 and the bracket 10.

In the electric conduction component fixation structure 201 of Example that has the above configuration, an electric resistance value with respect to a fastening torque of the second bolt 30 was measured. The electric resistance value was measured on the vehicle body 200 side by causing a current to flow to the earth terminal 100. The measurement result is shown in the graph of FIG. 5.

Figure 5:
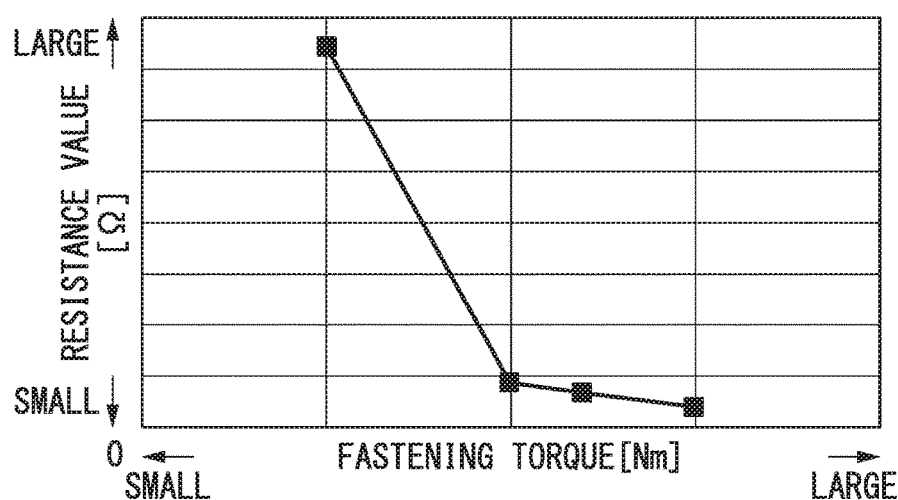
FIG. 5 is a graph showing a relationship between a fastening torque of a second bolt and an electric resistance value in the electric conduction component fixation structure of Example.

FIG. 5 is a graph showing a relationship between a fastening torque of the second bolt 30 and an electric resistance value in the electric conduction component fixation structure 201 of Example.

As shown in the graph of FIG. 5, it is found that the electric resistance value is decreased as the fastening torque (that is, an axial force that occurs) of the second bolt 30 is increased. That is, it is known that when the earth terminal 100 is fixed to the bracket 10, the rustproof coating film 80 between the earth terminal 100 and the bracket 10 is pressed, and the electric conduction properties is ensured.

The present invention is not limited to the embodiments described above with reference to the drawings, and a variety of modification examples can be considered within the technical scope.

For example, in the embodiments described above, the electric conduction component is the earth terminal 100; however, the electric conduction component is not limited to the earth terminal 100 and may be a component that is pressed by the press member and that have electrically conductive properties.

Further, the second bolt 30 is adopted for the press member in the first embodiment described above, and the bolt 110 is adopted for the press member in the second embodiment; however, the press member is not limited to the second bolt 30 and the bolt 110 and may be a member that press and fix the electric conduction component to the fixed member. Accordingly, for example, the press member may be a clip, a clamp member, and the like having a predetermined clamping force.

Further, the rustproof coating film 80 is formed on the surface of the second bolt 30 in the first embodiment described above, and the rustproof coating film 80 is formed on the surface of the bolt 110 in the second embodiment; however, the rustproof coating film 80 may be formed on inner wall surfaces of the second bolt hole 62 and the bolt hole 120. Alternatively, the rustproof coating film 80 may be formed on both the surface of the bolt (the second bolt 30 and the bolt 110) and the inner wall surfaces of the bolt hole (the second bolt hole 62 and the bolt hole 120).

Further, in the embodiment described above, the rustproof coating film 80 is formed on the surface of the bracket 10 as the fixed member and the surface of the second bolt 30, and the rustproof coating film 80 is formed on the surface of the vehicle body 200 and the surface of the bolt 110 in the second embodiment; however, the rustproof coating film 80 may be formed on at least the pressed surface (the pressed surface 10c of the bracket 10, the pressed surface 200c of the vehicle body 200) of the fixed member.

Further, the embodiments are described using a case in which the electric conduction component fixation structures 1, 101 are applied to a vehicle; however, the applicable scope of the electric conduction component fixation structures 1, 101 is not limited to a vehicle, and the electric conduction component fixation structures 1, 101 may be used for other applications.

The configuration elements in the embodiments described above can be appropriately replaced by known configuration elements without departing from the scope of the present invention.

What is claimed is:

1. An electric conduction component fixation structure, comprising:
   a fixed member which has electrically conductive properties;
   an electric conduction component that is arranged on the fixed member; and
   a press member that is arranged on the electric conduction component and that presses and fixes the electric conduction component to the fixed member, wherein
   the fixed member comprises: a pressed surface that is pressed when the electric conduction component is fixed by the press member; and
   a rustproof coating film that has a rustproof property and that is provided on the fixed member so as to cover the pressed surface, and
   the rustproof coating film comprises a plurality of metal flakes which are layered and a binder which joins the plurality of metal flakes.

2. The electric conduction component fixation structure according to claim 1, wherein
   the electric conduction component is an earth terminal, and
   the fixed member is any of a vehicle body and a vehicle body-side bracket.

3. The electric conduction component fixation structure according to claim 1, wherein
   the rustproof coating film has an electrically conductive property in a pressed state where the rustproof coating film is pressed when the electric conduction component is fixed by the press member, and
   the rustproof coating film has an insulation property when the pressed state is released.

4. The electric conduction component fixation structure according to claim 1, wherein
   the press member is a bolt,
   the electric conduction component is interposed between and held by a head part of the bolt and the pressed surface of the fixed member, and
   a bolt hole in which the bolt is screwed is provided on the fixed member.

5. The electric conduction component fixation structure according to claim 4, wherein
   the electric conduction component is an earth terminal, and
   the fixed member is any of a vehicle body and a vehicle body-side bracket.

6. The electric conduction component fixation structure according to claim 4, wherein
   the bolt has electrically conductive properties, and
   at least any one of a contact surface with the electric conduction component in the bolt, a male screw part of the bolt, and an inner wall surface of the bolt hole is covered by the rustproof coating film.

7. The electric conduction component fixation structure according to claim 6, wherein
   the electric conduction component is an earth terminal, and
   the fixed member is any of a vehicle body and a vehicle body-side bracket.

* * * * *